United States Patent [19]

Inoue

[11] 4,310,043

[45] Jan. 12, 1982

[54] RADIAL TIRE

[75] Inventor: Teruo Inoue, Yao, Japan

[73] Assignee: The Toyo Rubber Industry Co., Ltd., Osaka, Japan

[21] Appl. No.: 106,462

[22] Filed: Dec. 26, 1979

[30] Foreign Application Priority Data

Dec. 26, 1978 [JP] Japan ................ 53-162996

[51] Int. Cl.³ ........................ B60C 9/00; B60C 9/18
[52] U.S. Cl. ........................ 152/356 R; 152/357 R; 152/359; 152/361 R
[58] Field of Search .......... 152/353 R, 354 R, 356 R, 152/357 R, 359, 361 R

[56] References Cited

U.S. PATENT DOCUMENTS

| | | | |
|---|---|---|---|
| 3,513,898 | 5/1970 | Lugli et al. | 152/361 R |
| 3,838,725 | 10/1974 | Lejeune | 152/209 R |
| 3,861,439 | 1/1975 | Boileau | 152/359 |
| 3,989,083 | 11/1976 | Chrobak | 152/354 |
| 4,037,637 | 7/1977 | Arimura et al. | 152/361 R |
| 4,047,552 | 9/1977 | Maeda et al. | 152/361 R |
| 4,082,132 | 4/1978 | Arai et al. | 152/361 R |
| 4,185,677 | 1/1980 | Motomura | 152/362 R |

OTHER PUBLICATIONS

"Tire Technology" by Kovac, Goodyear Tire and Rubber Co., Akron, Ohio, 1973, p. 34.

*Primary Examiner*—John E. Kittle
*Attorney, Agent, or Firm*—Koda and Androlia

[57] ABSTRACT

A radial tire for trucks and buses which includes a belt layer whose steel cords are disposed at an angle of 15° to 25° relative to the circumferential direction of the tire and a carcass layer whose cord material is selected from materials having a K value equal to 10 to 15 as calculated by the equation $K = E/T$, where E is the tensile modulus of the cord material in $kg/mm^2$ and T is the breaking strength per unit area of the cord material in $kg/mm^2$. In accordance with various disclosed embodiments, the belt layer may be a three ply structure with the outer two plies substantially parallel with one another to provide a higher resistance to shock bursts; separation in such a belt layer may be further restrained by making the sum of the cord end counts per unit width of the second and third plies 1.50 to 1.80 times as large as the cord end count per unit width of the first ply, and/or by reducing the diameters of the cords in the second and/or third plies relative to the diameter of the first ply cords.

6 Claims, 5 Drawing Figures

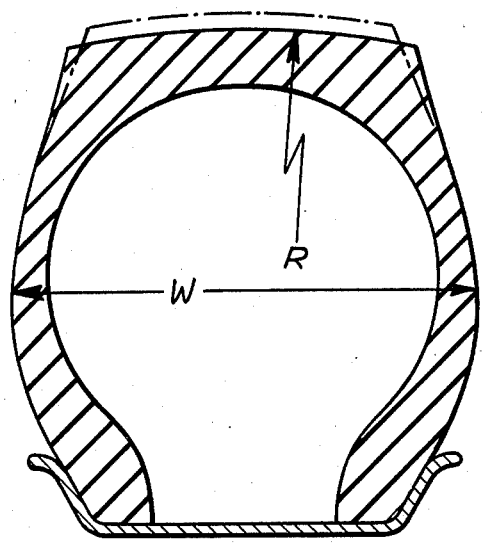
Fig. 1.
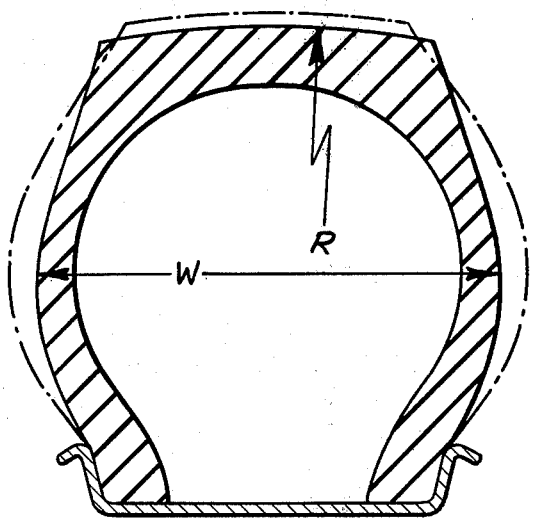
Fig. 2.
Fig. 3.
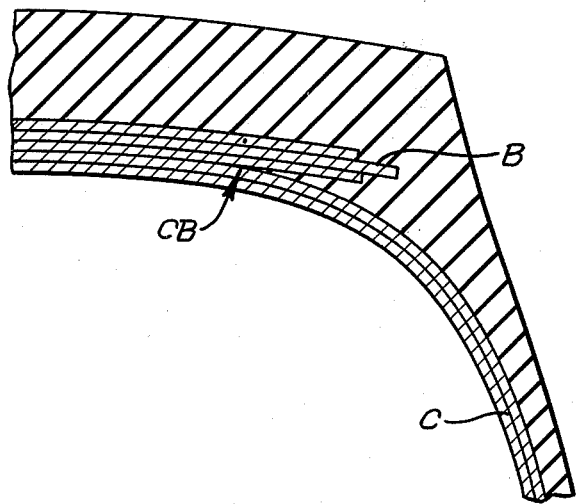

WIDTH OF CROSS SECTION OF TIRE (mm)

RADIAL TIRE

BACKGROUND OF THE INVENTION

1. Field of Invention

This invention relates to radial tires and more particularly to radial tires for use on heavy load vehicles such as trucks and buses.

2. Prior Art

In the prior art, radial tires generally have a carcass ply layer whose cords are radially disposed at an angle approximately 90° relative to the circumference of the tire and a steel belt layer which is provided as a reinforcing layer around the outside of the carcass ply layer. However, radial tires used on trucks and buses are used at a high air pressure. As a result, a large amount of stress is applied to the steel belt layer causing strain in a direction which decreases the angle of disposition of the steel cord of the belt layer. Accordingly, the outer diameter of the tire tends to grow. Furthermore, when the carcass cords are elongated by the tensile force generated in the carcass layer, the cross-sectional width of the tire also grows so that the cross-sectional shape of the tire is generally changed from the shape of the tire when the tire was new.

If high-modulus steel cords are used in the carcass plies, there is little elongation of the carcass cords. As a result, there is almost no growth in the width of the tire and the cross-sectional shape of tire shows a sizeable growth in the direction of the outer diameter of the tire, as indicated by the dotted line in FIG. 1. On the other hand, if low-modulus cords are used in the carcass plies the growth of the cross-sectional width W of the tire is greatly increased, so that the cross-sectional shape of the tire grows in the direction of the width of the tire, as indicated by the dotted line in FIG. 2.

When the cross-sectional shape of the tire undergoes such a great change, a shearing force is concentrated in the vicinity of the beginning of contact CB between the belt layer B and the carcass layer C as is shown in FIG. 3. As a result, separation occurs therein after tire running and the strength retention coefficient of the carcass ply cords drops remarkably in the beginning of the contact CB. Accordingly, the useful life of the tire is shortened. Thus, tire growth in the direction of the outer diameter of the tire and in the direction of the width of the tire has a substantial effect on tire durability.

If low-modulus steel cords are used for the cords in the carcass layer, it is necessary to increase the number of plies in the carcass layer in order to prevent growth of the tire in the direction of the cross-sectional width of the tire, such as is shown in FIG. 2. However, this leads to a drawback in that the carcass layer becomes excessively strong and also drawbacks in an increase of the tire weight and in heat build-up during tire running.

On the other hand, if high modulus steel cords are used for the cords in the carcass layer, it is necessary to increase the modulus of the belt layer in order to prevent growth of the tire in the direction of the outer diameter of the tire such as is shown in FIG. 1. However, any increase in the number of plies in the belt layer for this purpose is disadvantageous in the increase of tire weight and heat build-up during the tire running.

Accordingly, in conventional radial tires used on trucks and buses, for an example, a belt layer comprises three plies wherein the outer two plies have cords disposed at a relatively small angle, i.e. 15° to 25°, and the ply installed on the carcass layer side has cords disposed at a relatively large angle, i.e. 45° to 75°. In this way, triangle elements which undergo little change are formed at the area that cords of the respective plies intersect, so that the growth of the belt layer is restrained and separation in the vicinity of the beginning of contact CB between the belt layer and carcass layer caused by tire growth is prevented by the buffer effect produced by the intermediate angle ply installed between the small angle plies and the carcass layer disposed at an angle of 90°. FIG. 4 illustrates the disposition of the cords in such a conventional belt layer. Counting from the carcass layer side, B1 indicates the cords of the first ply, B2 indicates the cords of the second ply and B3 indicates the cords of the third ply of the belt layer. The cords B2 of the second ply intersect with the cords B3 of the third ply and both cords B2 and B3 are disposed at angles of 15° to 25° relative to the circumferential line CL of the tire. Meanwhile, the cords B1 of the first ply are disposed at an angle of 45° to 75° relative to the circumferential line CL of the tire. Thus, the three plies form triangle elements as shown by XYZ, X'Y'Z' in FIG. 4. However, since there is a large difference of angle between the cords of the first ply disposed at 45° to 75° and the cords of the other plies, the manufacturing process is complicated. Furthermore, the first ply having such a large angle is not particularly useful for restraining the stress caused in the circumferential direction of tire and the substantial strength of the steel cords cannot be efficiently utilized. Furthermore, since a multiple number of plies are formed using steel cords, the weight of the tire is substantially increased.

SUMMARY OF THE INVENTION

Accordingly, it is the general object of the present invention to provide a radial tire in which all of the steel cords in the belt layer are diposed at a small angle.

It is another object of the present invention to provide a radial tire in which the carcass layer does not have excessive strength and in which there is no separation in the vicinity of beginning of contact between the belt layer and the carcass layer.

It is still another object of the present invention to provide a radial tire which is highly resistant to shock bursts which tend to occur when the tire rides up over a stone or bump during the tire running.

It is yet another object of the present invention to provide a radial tire in which separation caused between cord ends in the belt layer and between the belt layer plies is greatly suppressed.

In keeping with the principles of the present invention, the objects of the present invention are accomplished by a unique tire structure in which the cord material used in the carcass layer has a K value between 10 to 15 in the following equation:

$$K = E/T$$

In the above equation, E is the tensile modulus of the cord material in $kg/mm^2$ and T is the breaking strength per unit area of the cord material in $kg/mm^2$. The latter value is obtained by dividing the breaking strength per cord by the cord area.

By using carcass cords with a K value indicated above it is possible to obtain a radial tire in which all of the steel cords in the belt layer are disposed at a small angle of 15° to 25° and in which the carcass layer does not have excessive strength and in which there is no separation in the vicinity of beginning of contact between the belt layer and the carcass layer. In addition, a tire thus constructed is light weight and easy to manufacture.

BRIEF DESCRIPTION OF THE DRAWINGS

The above-mentioned features and objects of the present invention will become more apparent with reference to the following description taken in conjunction with the accompanying drawings wherein like reference numerals denote like elements and in which:

FIG. 1 is a rough cross-sectional view illustrating tire growth in the direction of the outer diameter of the tire;

FIG. 2 is a rough cross-sectional view illustrating tire growth in the direction of the width of the tire;

FIG. 3 is partial magnified cross-sectional view illustrating the area of contact between the belt layer and the carcass layer;

DETAILED DESCRIPTION OF THE INVENTION

As is described above, the basic novel features of the present invention are that all of the steel cords used for the belt layer are disposed at a small angle, i.e. 15° to 25°, relative to the circumferential direction of the tire and the cord material used for the carcass layer has a K value which is 10 to 15 in the equation $K=E/T$. In this equation, E is the tensile modulus of the cord material in $kg/mm^2$ and T is the breaking strength per unit area of the cord material in $kg/mm^2$. The breaking strength is obtained by dividing the breaking strength per cord by the cord area.

For test tires, radial tires of 1000 R 20, 14 PR were prepared in which the belt layer and carcass layer were constructed as follows, and the growth condition during operation in these tires was tested. In each of the tires the steel belt layer comprises $3\times0.20+6\times0.38$ steel cords and has a three-ply construction in which the cord end count of each ply was 14/2.54 cm. The cords were disposed at an angle approximately 20° relative to the circumferential direction of the tire. For the carcass layer, a different cord material with a K value of 4.5 to 80 was used in each of the test tires. The breaking strength of the carcass of each test tire was identical. The K values and corresponding cord materials of the carcasses are shown in the following table:

| TEST TIRE | K VALUE | CORD MATERIAL |
|---|---|---|
| I | 4.5 | Nylon |
| II | 13.0 | Polyester |
| III | 17.5 | Rayon |
| IV | 29.5 | Kevlar (DuPont) |
| V | 80.0 | Steel |

Figure 5:
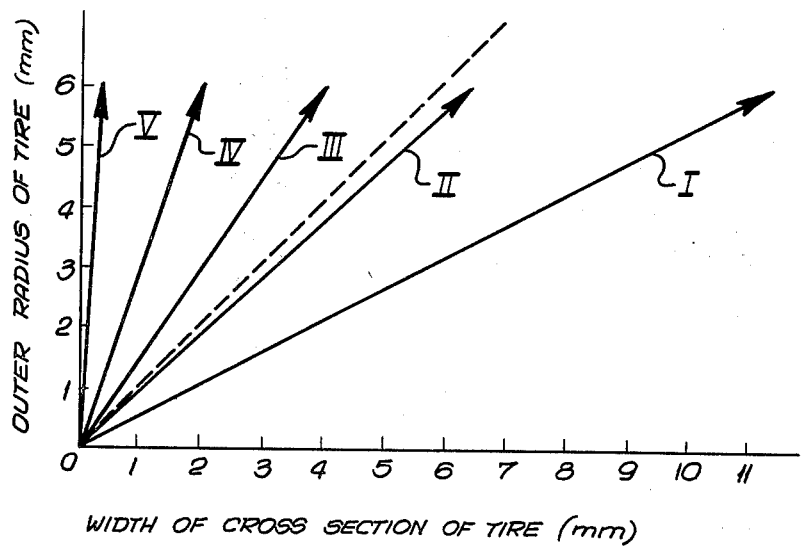
FIG. 5 is a comparative graph illustrating the conditions of growth in test tires using different cord material.

FIG. 5, which illustrates the relationship between the tire growth in the direction of the outer diameter of the tire and the tire growth in the direction of the cross-sectional width of the tire, clearly indicates that the growth of test tire II, which was a K value within the range of 10 to 15 as calculated in the above equation, is balanced between in the direction of the outer diameter of the tire and in the direction of the cross-sectional width of the tire.

Furthermore, for each of the above described test tires, the change in the radius of the curvature R of the crown portion of the tire (see FIG. 1 or FIG. 2) was examined in a 5000 km indoor running test at an air pressure equal to 7.25 $kg/cm^2$, and a load of 2425 kg. The results of the test are shown in the following table:

TABLE 1

| TEST TIRE | CARCASS MATERIAL | K VALUE | R BEFORE RUNNING (mm) | R AFTER RUNNING (mm) |
|---|---|---|---|---|
| I | Nylon | 4.5 | 480 | 900 |
| II | Polyester | 13.0 | 480 | 480 |
| III | Rayon | 17.5 | 480 | 460 |
| IV | Kevlar | 29.5 | 480 | 420 |
| V | Steel | 80.0 | 480 | 400 |

As is clear from the above Table 1, test tire II having a K value within the range of 10 to 15 showed no change in the radius of curvature after running. This indicates that test tire II grows in a very stable manner, and the tire is superior in resistance to irregular wear and advantageous in the durability of belt layer. Furthermore when calculated in a tire of 1000 R 20, a weight reduction of approximiately 7% was achieved in the tire provided by the present invention. Thus, the present invention provides a radial tire which is easy to manufacture and which has superior practical performance as described above.

Furthermore, another object of this invention is to provide a radial tire which is highly resistant to shock bursts which tend to occur when the tire rides up over a stone or a bump lying in the running path. In the following paragraphs resistance to shock bursts will be discussed.

For an additionally improved or prefered design to the tire wherein, the steel cords in the belt layer are disposed at a small angle, i.e. 15° to 25°, and the cords in the carcass plies have a K value of 10 to 15 as calculated in the above described equation, a construction design is employed in which the belt layer has a three-ply structure and the cords of the second and third plies counting from the carcass layer side are disposed approximately in parallel with each other. The running tires are in constant danger of having the tread cut by sharp stones or pieces of iron, etc., lying in the path. In some cases, tire damage may extend to the steel cords and results in the breakage of the steel cords. When a tire in such a condition rides over a large bump or stone, the tire is unable to withstand the great tensile force acting on the steel cords and as a result the tire bursts. In order to reduce the weight of the tire and simplify the manufacturing process, it is possible to use two plies of high-strength steel cords in the belt layer disposed at an angle of 15° to 25° so that the cords intersect with each other. In such a case, however, if the outer ply is cut, the strength of the belt layer of bias structure is greatly reduced so that it is easy for shock bursts to occur. Furthermore, even in cases where the belt layer has three-ply structure, the strength of the belt layer is reduced if the steel cords in either of the two outer plies are cut and the tire is susceptible to shock burst.

Accordingly, in an improved embodiment of the tire provided by the present invention, the belt layer is given a three-ply structure and cords of the two outer plies (i.e. the second and third plies as counted from the carcass layer side) are provided approximately in parallel with each other. In this way, even if some of the cords are partially cut, the stress can be supported by other cords in the vicinity of the cut area and a tire is obtained which is highly resistant to shock bursts.

The following is a description of test results from test tires with various numbers of plies in the belt layer and various angles of disposition of steel cords. 1000 R 20, 14 PR tires were tested. In each of the test tires, the carcass layer was three-ply structure of polyester cords (1500 d/3, K=13). 3×0.20+6×0.38 steel cords were used for each belt layer with end counts of 14/2.54 cm. The modulus in the direction of the circumference of the tire affecting upon the resistance property of the belt layer was identical in each test tire. In each case, 5 cords in the outermost belt layer ply were cut, the tread portion of the tire was pressed with a plunger and the breaking energy was measured.

To indicated the dispositions of the steel cords in the belt layer plies, the cords of the first, second and third plies counting from the carcass layer side are labeled 1, 2 and 3 respectively in the Table 2.

Figure 4:
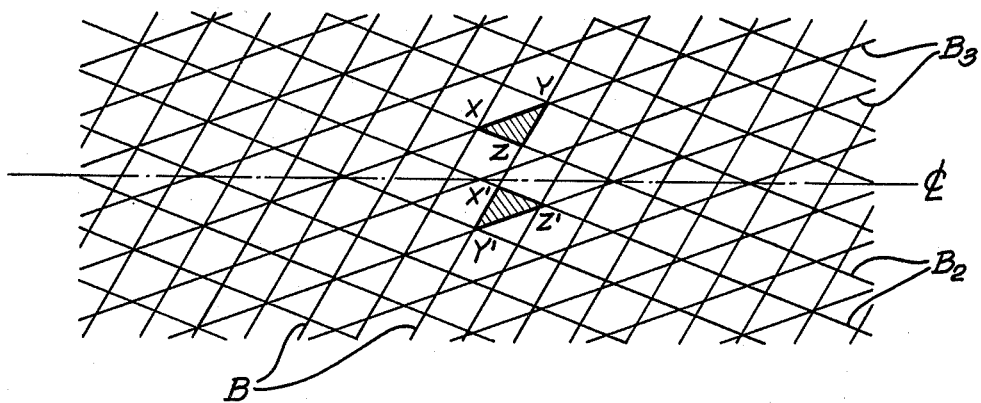
FIG. 4 is a descriptional diagram illustrating the combination of steel cords in a belt layer of a conventional radial tire used on trucks and buses.

In the test tire VI in Table 2, all cords of three plies intersect with each other. This is the tire shown in FIG. 4 in which the cords of the first ply are disposed at a large angle. In the test tire VII, which has two plies in the belt layer, the cords of both plies are disposed so that they intersect with each other. In the test tire VIII, the cords of the first and third plies are disposed parallel to each other and the cords of the second ply are disposed so that they intersect with the cords of the first and third plies. In the test tire IX, the cords of the second and third plies are disposed parallel with each other and the cords of the first ply are disposed so that intersect with the cords of the second and third plies. In the test tire X, the cords of the first and second plies are disposed in parallel with each other and the cords of the third ply are disposed so that they intersect with the cords of the first and second plies. The results of a comparison of the breaking energies of the above test tires are shown as resistance indices in Table 2.

TABLE 2

| TEST TIRE | NUMBER OF PLIES IN THE BELT LAYER | DISPOSITION OF THE CORDS IN THE BELT LAYER | RESISTANCE INDEX (BREAKING ENERGY) |
| --- | --- | --- | --- |
| VI | 3 | (2,3 / 1) | 100 |
| VII | 2 | (2 / 1) | 82 |
| VIII | 3 | (2 / 1,3) | 148 |
| IX | 3 | (3 / 2,1) | 165 |
| X | 3 | (3 / 1,2) | 120 |

The above table clearly shows that the test tire IX, which has a belt layer with a three-ply structure in which the cords of the second and third plies are disposed in parallel with each other, has the most superior resistance to shock bursts in a case where the outermost ply cords are cut.

Another object of the present invention is to provide a radial tire in which separation in the belt layer and separation between the cord edges of the belt layer are restrained. For this purpose, the following additional design features are added to the tire described above in which the belt layer has a three-ply structure, all of the steel cords in the belt layer are diposed at a small angle and the cord material used in the carcass layer has a K value of 10 to 15 as calculated in the above equation. Specifically, in this additional design, the three-ply belt layer is constructed so that the sum of the steel cord end counts per unit width of the second and third plies of the belt layer, counting from the carcass layer side, is 1.50 to 1.80 times as large as the steel cord end count per unit width of the first ply of the belt layer. In tires, separation in the belt layer is caused by repeated interply shearing force generated by deformation of the tire during tire running. In particular, it is caused by a concentration of stress at the cord edges. First, separation from the topping gum occurs at the cord edges in each ply. This leads to separation between adjacent cords and eventually to separation of the belt layer. Thus, the end counts and the thickness of the steel cords has a substantial effect on separation in the belt layer.

Separation can be restrained by reducing the cord end counts. However, this reduces the strength of the belt layer and is especially disadvantageous in shock resistance of the tire. It has been ascertained that making the sum of the cord end counts per unit width of the second and third plies 1.50 to 1.80 times as large as the cord end count per unit width of the first ply is extremely effective in increasing the separation resistance of the belt layer and that this structure is also very effective in preventing shock bursts. Furthermore, it has been ascertained that a similar effect can be obtained even if the diameters of the steel cords in the second or third plies of the belt layer are smaller than the diameter of the steel cords in the first ply.

The following is a description of test results obtained using test tires.

The test tires were 1000 R 20 14 PR. Each carcass layer has a three-ply structure composed of the same cords shown in Table 2. Each belt layer has the three-ply structure in which the cords of the second and third plies were disposed approximately parallel to each other, as in the test tire IX in Table 2. The angle of disposition of the cords in all three plies was 15° to 25°. Two types of steel cords were used in the belt layers, i.e. thick cords (3×0.22+6×0.38; cord diameter 1.22 mm φ) and thin cords (3×0.175+6×0.32; cord diameter 1.00 mm φ). The modulus of the belt layer in the direction of the circumference of the tire was identical in all of the test tires.

A drum test was conducted for investigating the durability of each belt layer under a heavy load and the results were compared as indices. Furthermore, the breaking energy against the three plies as a whole was measured for each tire and the results were also compared as indices. Both results are shown in Table 3. In each of the tires the test conditions were that the air pressure was 7.25 kg/cm², the load was 180% of JIS standard (i.e. 2700 kg×1.8), the speed was 50 km/hr, and the test drum diameter was 1708 mm φ.

TABLE 3

| TEST TIRE | CORD END RATIO | STEEL CORD DIAMETER OF BELT LAYER | | | DURABILITY INDEX OF BELT LAYER | RESISTANCE INDEX (BREAKING ENERGY) |
| --- | --- | --- | --- | --- | --- | --- |
| | | 1st Ply (mm) | 2nd Ply (mm) | 3rd Ply (mm) | | |
| XI | 2.0 | 1.22φ | 1.22φ | 1.22φ | 100 | 100 |
| XII | 1.7 | 1.22φ | 1.22φ | 1.22φ | 121 | 97 |
| XIII | 1.3 | 1.22φ | 1.22φ | 1.22φ | 129 | 63 |
| XIV | 2.0 | 1.22φ | 1.00φ | 1.00φ | 107 | 97 |
| XV | 1.7 | 1.22φ | 1.00φ | 1.00φ | 126 | 94 |

Note: the term "cord end ratio" refers to the value obtained by dividing the sum of the steel end counts per unit width of the second and third plies of the belt layer by the steel cord end count per unit width of the first ply of the belt layer.

The results of Table 3 clearly show that a radial tire which is highly resistant to separation and which has good durability can be obtained either by fixing the cord end ratio at 1.50 to 1.80 or by making the diameters of the cords in the second and third plies smaller than the diameter of the cords in the first ply.

It should be apparent to those skilled in the art that the above described embodiments are merely illustrative of but a few of the many possible specific embodiments which represent the applications and the principles of the present invention. Numerous and varied other arrangements can be readilty devised by those skilled in the art without departing from the spirit and scope of the invention.

I claim:

1. A radial tire for trucks and buses comprising a tread, a belt layer and a carcass layer characterized in that
   (a) said belt layer is a three ply structure comprising first, second and third plies counted from said carcass layer and with all cords in said belt layer being steel cords disposed at an oblique angle of 15° to 25° relative to a circumferential direction of said tire and with the cords in the second and third plies immediately below said tread being disposed substantially in parallel with each other; and
   (b) a cord material used in said carcass layer has a K value of 10 to 15 as calculated by the equation K=E/T, wherein E is the tensile modulus of said cord material in kg/mm² and T is the breaking strength per unit area of the cord material in kg/mm².

2. A radial tire for truck and buses according to claim 1, wherein a sum of the cord end counts per unit width of said second and third plies immediately below said tread is 1.5 to 1.8 times as large as the cord end count per unit width of said first ply of said three ply belt layer structure.

3. A radial tire for trucks and buses according to claim 1, wherein said steel cords in said second and third plies immediately below said tread are smaller in diameter than a diameter of said steel cords in said first ply of said three ply belt layer structure.

4. A radial tire for trucks and buses according to claim 1, wherein a diameter of said steel cords in a second ply of said three ply belt layer structure are smaller in diameter than the diameter of said steel cords in said first ply of said three ply belt layer structure.

5. A radial tire comprising a carcass ply with all its cords being radially disposed adjacent the tire's sidewalls and perpendicular relative to the tread circumference and further comprising a three-ply tread reinforcing belt comprising first, second and third plies counted from said carcass layer and with all its cords disposed at an oblique angle relative to said tread cicumference, characterized in that
   (a) the cords contained within said carcass ply are formed from a polyester material, and
   (b) the cords contained within said tread reinforcing belt are formed from steel,
   (c) the cords contained within the second and third plies of said three-ply belt furthest removed from said carcass ply are disposed substantially parallel to one another, and
   (d) the "cord end ratio" associated with said tread reinfocing belt is 1.5 to 1.8, wherein said "cord end ratio" is defined as the value obtained by dividing the sum of the steel end counts per unit width of the second and third plies of the belt layer by the steel cord end count per unit width of the first ply of the belt layer.

6. The radial tire of claim 5, further characterized in that
   (e) the cord diameter associated with the first ply of said three-ply belt which is closest to said carcass ply is greater than the average cord diameter associated with said second and third plies which are furthest removed from said carcass ply.

* * * * *